United States Patent [19]

Suzuki et al.

[11] Patent Number: 4,730,901

[45] Date of Patent: Mar. 15, 1988

[54] LENS BARREL WITH INTERNAL MOTOR FOCUSING

[75] Inventors: Ryuji Suzuki; Masao Aoyagi, both of Kanagawa; Shigeru Kamata, Tokyo; Keiichi Yasuda, Tokyo; Hiroshi Furukawa, Tokyo, all of Japan

[73] Assignee: Canon Kabushiki Kaisha, Tokyo, Japan

[21] Appl. No.: 947,896

[22] Filed: Dec. 30, 1986

[30] Foreign Application Priority Data

Jan. 10, 1986 [JP] Japan .............................. 61-001909[U]
Dec. 9, 1986 [JP] Japan .............................. 61-189646[U]

[51] Int. Cl.⁴ .............................................. G02B 7/04
[52] U.S. Cl. ................................................... 350/255
[58] Field of Search .............................. 350/255, 429; 354/195.1, 400; 352/140

[56] References Cited

U.S. PATENT DOCUMENTS

| | | | |
|---|---|---|---|
| 4,519,691 | 5/1985 | Yamada et al. | 350/255 |
| 4,525,053 | 6/1985 | Shiokama et al. | 354/400 |
| 4,527,879 | 7/1985 | Hosoe et al. | 354/400 |
| 4,598,989 | 7/1986 | Yamada et al. | 354/400 |

Primary Examiner—William H. Punter
Attorney, Agent, or Firm—Fitzpatrick, Cella, Harper & Scinto

[57] ABSTRACT

A lens barrel includes a stationary tube secured to the inner side of a stationary lens barrel member with a given space kept between them, and a motor disposed within the space. A helicoidal surface is arranged along the inner circumference of the stationary tube to be in screwed engagement with the helicoidal surface of a lens-carrying frame arranged to carry lenses which are shiftable in the direction of their optic axis, and a connecting member extends to the inner circumference of the stationary tube to cause the rotation of a rotary tube which has a toothed part engaging the output gear of the motor to be transmitted to the lens-carrying frame.

14 Claims, 2 Drawing Figures

LENS BARREL WITH INTERNAL MOTOR FOCUSING

BACKGROUND OF THE INVENTION

1. Field of the Invention

This invention relates to a lens barrel incorporating a motor therein and arranged to have a lens which is shiftable in the direction of the optic axis thereof driven by the rotation output of the motor.

2. Description of the Related Art

There are many known lens barrels of the kind incorporating a motor for driving a stop unit, a focusing lens or a zoom lens. The motors incorporated in the conventional lens barrels include the so-called pencil type motors (or solid type motors) such as cored motors, coreless motors and brushless motors and hollow type motors which are known from Japanese patent publication No. Sho 56-51383 and Japanese Laid-Open patent application No. Sho 56-147131. The conventional motor-incorporating lens barrel using the above-stated pencil type motor has necessitated either the provision of a protrudent part on the outside of the lens barrel for placing the motor within the lens barrel or, in order to avoid such a protrudent part, a special arrangement of the optical system of the lens barrel to increase a lens spacing interval or to stop down the light-flux passing diameter of the optical system. However, such arrangement has resulted in increases in the size and cost of the lens barrels. Further, the hollow-type motor has excessively complicated the lens barrel arrangement because of a rotor unit and stator unit which must be arranged on the inner and outer circumferential sides of lens barrel members forming the lens barrel.

SUMMARY OF THE INVENTION

It is an object of this invention to provide a motor-incorporating lens barrel which is capable of avoiding complication of the structural arrangement thereof.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
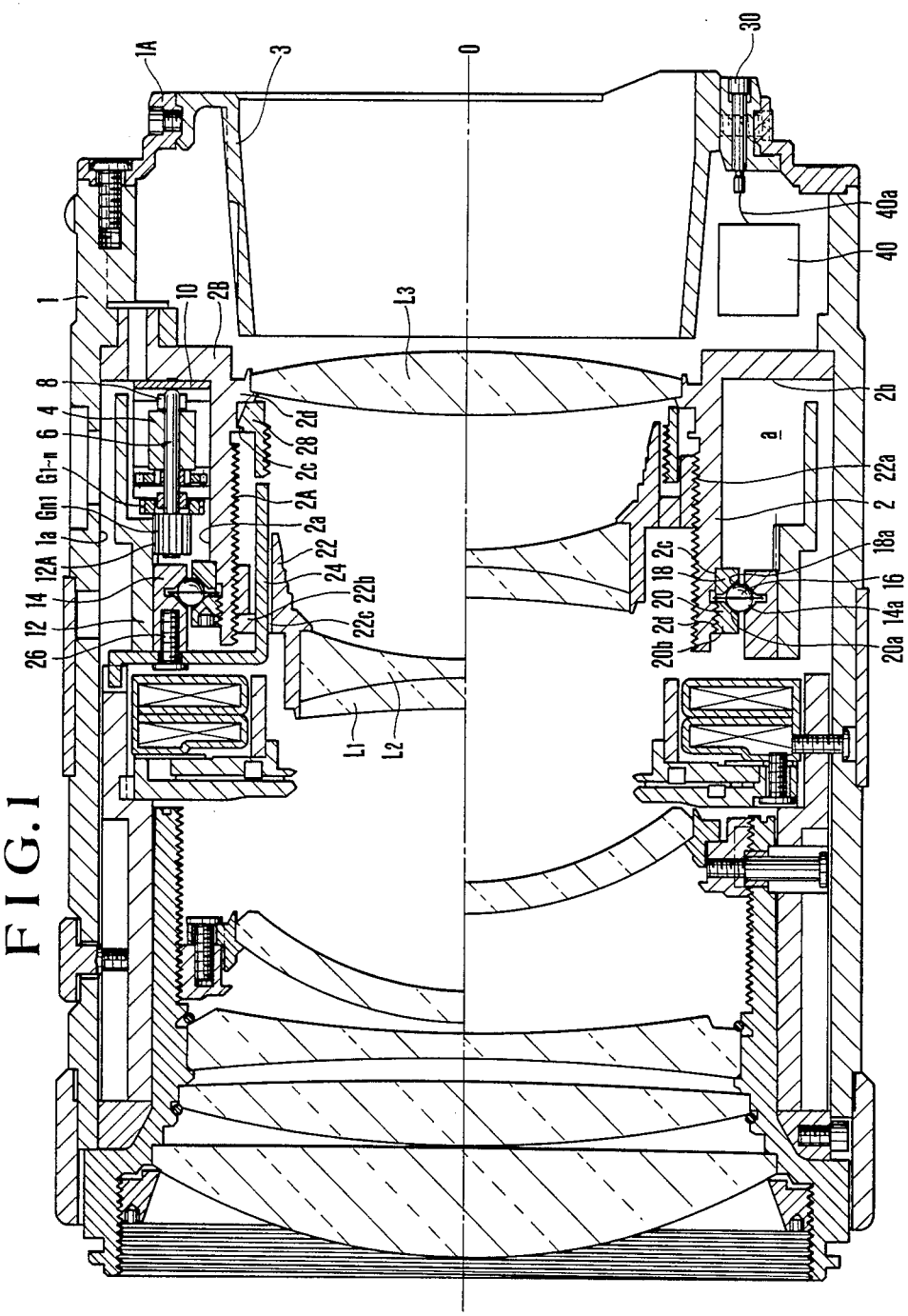
FIG. 1 is a sectional view showing a lens barrel arranged according to this invention as a first embodiment thereof.

FIG. 1 shows in a sectional view a lens barrel arranged as a first embodiment of this invention. Referring to the drawing, a stationary member 1 which is arranged to serve also as an external fixture ring is provided with a mount member 1A. The mount member 1A is disposed at one end of the stationary member 1 and is arranged to engage a corresponding mount member which is disposed on the side of a camera body which is not shown.

A stationary tube 2 is disposed on the inner circumferential side of the stationary member 1 and is fixed in position with a given space interval "a" kept between them. A helicoidal surface 2A is formed on the inner circumferential side of the stationary tube 2. A flange part 2B radially extends from the tabular outer circumference of the base part of the stationary tube 2 and is arranged to have the stationary tube 2 secured to the stationary member 1 by means of the flange part 2B. A light shield tube 3 is secured to the mount member 1A and is arranged to extend from the above-stated stationary tube 2 toward the mount in the direction of the optic axis. A motor body 4 is disposed within the space "a". The space "a" is encompassed with the inner wall surface 1a of the tubular stationary member 1 and the outer wall surface 2a of the base part of the stationary tube 2 which is also in a tubular or cylindrical shape.

The motor body 4 is, for example, a solid type motor and has its rotor and stator schematically indicated by the reference numeral 4. The illustration includes a motor shaft 6; a bearing 8 which bears the motor shaft 6; a support plate 10 is arranged to carry the bearing 8; and a reduction gear train G1 to Gn which is arranged to reduce the rotating velocity of the motor shaft 6. A gear tube 12 is disposed in between the inner circumference of the stationary member 1 and the stationary tube 2. The tube 12 is provided with an inner toothed part 12A which is arranged at one end of the tube 12 to engage a gear Gn1 which is disposed at the output end of the reduction gear train. Further, to the inner side of the gear tube 12 is secured a rotary ring 14.

The rotary ring 14 is in a tubular shape. A ball track groove 14a is formed on the inner circumferential surface of the rotary ring 14 and is arranged to carry bearing balls 16. The balls 16 are carried by a ball race which is formed by the ball receiving surfaces 18a and 20a of ball receiving members 18 and 20 disposed on the outer circumferential side of the stationary tube 2 and the above-stated groove 14a of the rotary ring 14. These balls 16 thus make a circle around the optic axis.

The ball receiving member 18 is secured to a stepped part 2c formed on the outer circumference of the stationary tube 2. The other ball receiving member 20 is provided with a thread 20b which is in screwed engagement with a thread 2d provided along the outer circumference of the stationary tube 2.

A lens carrying frame 22 is arranged on the inner circumferential side of the stationary tube 2 to carry focusing lenses L1 and L2. On the outer circumferential side of the lens carrying 22 is formed a helicoidal surface 22a which is arranged to engage the inner circumferential helicoidal surface 2A of the stationary tube 2. An L-shaped connection member 24 has one side thereof disposed at the gear tube 12 and secured to one end of the rotary ring 14 with a screw 26 and has the other side thereof arranged to extend to the inner circumferential side of the stationary tube 2 and to pierce an engaging hole 22c which is provided in the flange part 22b of the above-stated lens carrying frame 22. A reflection preventing ring 28 is press fitted by virtue of resilience in between a retainer part 2c provided on the rear end inner circumferential side of the stationary tube 2. A signal terminal 30 is provided on the mount member 1A and is electrically connected to a printed circuit board 40 which is disposed within the lens. Meanwhile, the printed circuit board 40 is electrically connected via lead wires or the like to the motor body 4.

The lens barrel which is arranged in this manner is mounted on a camera which is not shown. A known focal point control system can be used for the lens barrel and the camera, for example, in the following manner: The camera includes a distance measuring element; a circuit which detects the focusing state of the focusing lenses L1 and L2 by receiving a signal from the distance measuring element; and a circuit which computes and obtains according to a signal from the detecting circuit a control signal to be supplied to the above-stated motor body 4. The control signal which is computed on the side of the camera is received at the signal terminal 30 which is disposed on the mount member 1A. A circuit which drives the motor body 4 is formed on the printed circuit board 40. The signal is supplied via a lead wire 40a to the printed circuit board 40 which is arranged to effect a power supply to the motor body 4. The direction in which the motor body 4 is to be rotated by the focal point control system is determined by the positions of the focusing lenses L1 and L2. The rotor of the motor body 4 is thus caused to rotate either to the right or to the left according to the positions of the focusing lenses.

The rotation of the rotor is transmitted to the gear tube 12 via the rotation shaft 6, the gear train G1 to Gn and the output gear Gn1. Then, the bearing means of the rotary ring 14 allows the gear tube 12 to rotate along the inner side of the stationary lens barrel member 1. The rotation of the gear tube 12 is transmitted via the connection member 24 to the lens carrying frame 22. Since the helicoidal surface 22a of the lens carrying frame 22 engages the helicoidal surface part 2A of the inner circumference of the stationary tube 2, the connection member 22 causes the lens carrying frame 22 to draw forward the move in parallel to the optic axis by turning it around. A focusing operation is accomplished by thus shifting the positions of the focusing lenses L1 and L2.

In accordance with the arrangement of this embodiment, the motor body 4 and the gear train G1 to Gn are disposed within a space "a" provided in between the stationary member 1 which serves also as an external fixture ring and the stationary tube 2. The rotation output of the output gear Gn1 of the gear train is transmitted to the gear tube 12 disposed on the inner circumferential side of the stationary member 1. The stationary tube 2 and the lens carrying frame 22 are arranged to be in screwed engagement with each other through helicoidal surfaces. Meanwhile, the lens carrying frame 22 is coupled with the gear tube 12 via the connection member 24 for transmitting a rotating force. By virtue of this arrangement, the lens barrel can have structural arrangement which does not have any part protruding to the outside of the lens barrel assembly.

Further, the rotation output of the gear train G1 to Gn is arranged to be received by the gear tube 12 which is disposed on the outside of the output gear Gn1. The rotation of the gear tube 12 is arranged to be transmitted via the rotary ring 14 and the connection member 24 to the helicoidal surface part 22a of the lens carrying frame 22 which is engaging the helicoidal surface part 22a of the stationary tube 2. This helicoidal coupling arrangement between the lens carrying frame 22 and the stationary tube 2 ensures stable movement of the focusing lenses L1 and L2 for a smooth focusing operation.

Figure 2:
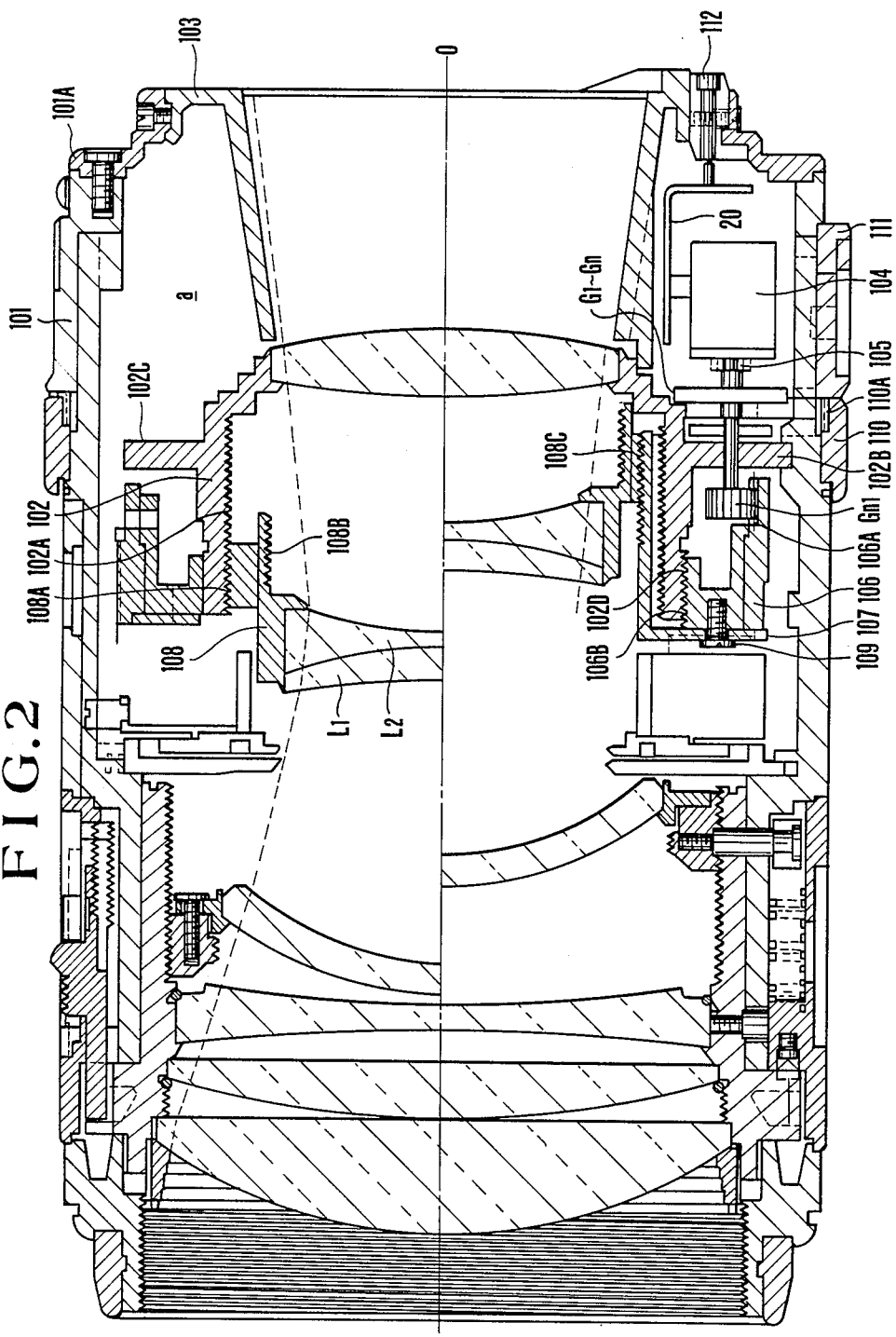
FIG. 2 is a sectional view showing another lens barrel as a second embodiment.

A second embodiment of this invention is arranged as shown in FIG. 2. The second embodiment differs from the first embodiment mainly in the location of the motor. The rest of the second embodiment is, for the most part, similar to the first embodiment. Referring to FIG. 2, a stationary member 101 which is arranged to serve also as an external fixture ring is provided at one end thereof with a mount member 101A for coupling with a mount member provided on the side of a camera which is not shown. A stationary tube 102 is disposed on the inner circumferential side of the stationary member 101 with a given space "a" kept in between them. A helicoidal surface 102A is formed on the inner circumferential side of the stationary tube 102. A flange part 102B radially extends toward the outside from the outer circumference of the base part of the stationary tube 102. The tube 102 is secured to the stationary member 101 at this flange part 102B. A light shielding tube 103 which is secured to the mount member 101A is disposed away from the stationary tube 102 in the direction of an optic axis 0 with the same space "a" also kept between the tube 102 and the tube 103. A motor body 104 is disposed within the space "a". The space "a" is encompassed with the inner wall surface 101a of the tubular stationary member 101, the wall surface 102C of the flange part 102B of the stationary tube 102, the outer wall surface of the light shielding tube 103 and the inner wall surface of the mount member 101A. A solid type motor is employed. The motor body consisting of a rotor and a stator is schematically indicated by a reference numeral 104. The motor arrangement includes a motor shaft 105 and a reduction gear train G1 to Gn which is arranged to reduce the rotation of the motor shaft (or rotor shaft) 105. The gear train is provided with an output gear Gn1. A gear tube 106 is disposed on the inner circumferential side of the stationary member 101 and on the outer circumferential side of the stationary tube 102. On the inner circumferential side of one end of the gear tube 106 is formed an inner toothed part 106A which is arranged to engage the above-stated output gear Gn1 of the reduction gear train. Meanwhile, a thread part 106B is formed at the other end of the gear tube 106. The thread part 106B is in screwed engagement with a thread part 102D which is formed on the outer side of the stationary tube 102. A lens carrying frame 108 is arranged on the inner circumferential side of the stationary tube 102 to carry focusing lenses L1 and L2. The lens carrying frame 108 is provided with a helicoidal surface 108A which engages the inner circumferential helicoidal surface of the stationary tube 102. An L-shaped connection member 107 has one part thereof secured with a screw 109 to one end of the gear tube 106. The other part of the connection member 107 radially extends in the direction of the optic axis and engages an engaging slot 108C provided in the flange part 108B of the lens carrying frame 108. A manual focusing operation member 110 is provided with toothed part 110A which is formed on the inner circumferential side of the member 110. A manual/automatic focusing selection member 111 is arranged as follows: When the position of the selection member 111 is shifted to a manual focusing position thereof, the connection among the reduction gear train G1 to Gn is changed in part by a clutch device which is not shown to render thereby the output gear Gn1 responsive to the toothed part 110A of the manual focusing member 110.

The lens barrel which is arranged as described above is mounted by means of the mount member 1A on a camera which is not shown. A known focal point control system can be used for the lens barrel and the camera. For example, the focal point control system includes a circuit which detects the focusing state of the focusing lenses L1 and L2 by receiving a signal from a distance measuring element which is also included in the system; and a circuit which performs computation according to a signal from the detecting circuit to obtain a control signal to be applied to the above-stated motor body 104. These circuits are disposed within the camera. The signal thus computed on the side of the camera is received at a signal terminal 112 which is disposed on the mount member 101A. A circuit which drives the motor body 104 is formed on a printed circuit board 120. The signal which comes via the terminal 112 is supplied to the printed circuit board 120. A current is supplied via a lead wire from the printed circuit board 120 to the motor body 104 according to the signal. The direction in which the motor body 104 is to be rotated by the above-stated focal point control system is determined according to the positions of the focusing lenses L1 and L2. The rotor of the motor body 104 is thus caused to rotate either to the right or to the left accordingly. The rotation of the rotor is transmitted via the rotation shaft 105, the gear train G1 to Gn and the output gear Gn1 to the gear tube 106. Then, the gear tube 106 rotates on the outer circumferential side of the stationary tube 102, around the optic axis. The rotation of the gear tube 106 is transmitted through the connection member 107 to the lens carrying frame 108 which is disposed on the inner circumferential side of the stationary tube 102. Since the helicoidal surface 108A of the lens carrying frame 108 engages the helicoidal surface part 102A on the inner circumferential side of the stationary tube 102, the rotation of the connection member 107 causes the lens carrying frame 108 to draw forward in the direction of the optic axis. With the frame 108 moved in this manner, the positions of the focusing lenses L1 and L2 are adjusted to accomplish a focusing operation. The second embodiment is capable of attaining the same advantageous effects as those attainable by the first embodiment. In the second embodiment, among the motor arrangement 104, G1 to Gn and Gn1, the motor body 104 is not disposed on the outer circumferential side of the stationary tube 102 but is disposed on the outer circumferential side of the light shielding tube 103. At least the output gear Gn1 is disposed on the outer circumferential side of the stationary tube 102 and is arranged to engage the gear tube 106. The motor body 104 and the gear tube 106 are thus arranged not to overlap the outer circumferential side of the stationary tube 102 (in the radial direction). Therefore, this arrangement enables the motor to be incorporated in the lens barrel without increasing the outside diameter of the lens barrel.

What is claimed is:

1. A lens barrel comprising:
   a stationary tube secured to an inner side of a stationary lens barrel member with a predetermined space kept between said stationary tube and said stationary lens barrel member;
   a motor arrangement disposed within said predetermined space;
   a first helicoidal surface formed on an inner circumferential side of said stationary tube;
   a second helicoidal surface formed on a lens carrying frame which is arranged to carry and shift movable lenses in the direction of the optic axis of said lenses, said second helicoidal surface being in screwed engagement with said first helicoidal surface;
   a rotary tube arranged in between said lens barrel member and said stationary tube to be rotatable by the rotation output of said motor arrangement; and
   a transmission member arranged to transmit therethrough the rotation of said rotary tube to said lens carrying frame and to cause said lens carrying frame to move in the direction of the optic axis by rotating said lens carrying frame with the rotation output of said motor arrangement.

2. A lens barrel according to claim 1, wherein said lens barrel member is arranged to serve as a tubular or cylindrical external fixture ring.

3. A lens barrel according to claim 1, wherein said motor arrangement includes a motor body, a reduction gear train and an output gear.

4. A lens barrel according to claim 1, wherein said lens carrying frame is disposed on the inner circumferential side of said stationary tube with said second helicoidal surface formed on an outer circumferential side of said lens carrying frame.

5. A lens barrel according to claim 1, wherein said lenses which are shiftably carried by said lens carrying frame to be movable in the direction of said optic axis are employed as focusing lenses.

6. A lens barrel according to claim 3, wherein said rotary tube is provided with a toothed part which engages the output gear of said motor arrangement.

7. A lens barrel according to claim 3, wherein said rotary tube consists of at least a first rotating member which is provided with a toothed part for engaging said output gear of said motor arrangement, and a second rotating member which is secured to said first rotating member and is arranged to be responsive to said transmission member.

8. A lens barrel according to claim 4, wherein said transmission member has one end thereof secured to said rotary tube and an opposite end to said lens carrying frame, said transmission member radially extending to have said ends thereof located in radially extended positions on two sides of said stationary tube.

9. A lens barrel according to claim 3, further comprising a bearing arrangement which includes bearing balls and is disposed in between said stationary tube and said rotary tube, said rotary tube being carried to be rotatable relative to said stationary tube.

10. A lens barrel according to claim 7, further comprising a bearing arrangement which includes bearing balls and is disposed in between said stationary tube and said second rotating member, said second rotating member being arranged to be rotatable relative to said stationary tube.

11. A lens barrel, comprising:
    a stationary tube secured to an inner side of a stationary lens barrel member with a predetermined space kept between said stationary tube and said stationary lens barrel member;
    a motor arrangement disposed within said predetermined space;
    a first helicoidal surface formed on an inner circumferential side of said stationary tube;
    a second helicoidal surface formed on a lens shifting cylindrical member which is arranged to carry and shift movable lenses in the direction of the optic axis of said lenses, said second helicoidal surface being in screwed engagement with said first helicoidal surface;
    a rotary tube arranged at least inside of said lens barrel member to be rotatable by the rotation output of said motor arrangement; and
    a transmission member arranged to transmit therethrough the rotation of said rotary tube to said lens shifting member and to cause said lens shifting member to move in the direction of said optic axis by rotating said lens shifting member with the rotation output of said motor arrangement.

12. A lens barrel, comprising:

a stationary lens barrel member;

a stationary tube and a light shielding tube arranged away from each other in the direction of an optic axis with a predetermined space kept between an inner side of said stationary lens barrel member and each of said stationary tube and said light shielding tube;

a motor arrangement disposed within said predetermined space, said motor arrangement including a motor body which is disposed on an outer circumferential side of said light shielding tube and an output gear which is disposed on an outer circumferential side of said stationary tube;

a first helicoidal surface formed on an inner circumferential side of said stationary tube;

a second helicoidal surface formed on a lens carrying frame which is arranged to carry and shift movable lenses in the direction of the optic axis of said lenses, said second helicoidal surface being in screwed engagement with said first helicoidal surface;

a gear tube which engages the output gear of said motor arrangement and is arranged to be rotated by the rotation of said output gear; and a transmission member arranged to transmit therethrough the rotation of said gear tube to said lens carrying frame and to cause said lens carrying frame to shift in the direction of said optic axis by causing said lens carrying frame to be rotated by the rotation of said output gear of said motor arrangement.

13. A lens barrel according to claim 12, further comprising a mount member for mounting said lens barrel on a camera, said mount member being provided with a signal terminal for transmission of an electrical signal between said lens barrel and said camera.

14. A lens barrel according to claim 13, wherein said light shielding tube is disposed closer to said mount member than said stationary tube; and said motor body is disposed close to said signal terminal.

* * * * *

UNITED STATES PATENT AND TRADEMARK OFFICE
CERTIFICATE OF CORRECTION

PATENT NO. : 4,730,901

DATED : March 15, 1988

INVENTOR(S) : Ryuchi Suzuki, et al.

It is certified that error appears in the above-identified patent and that said Letters Patent is hereby corrected as shown below:

COLUMN 2

Line 6, "mount" should read --mount member--.
    Line 44, "lens carrying 22" should read --lens carrying frame 22--.

COLUMN 3

Line 29, "the move in parallel to" should read --and move in parallel with--.

COLUMN 4

Line 59, "mount member 1A" should read --mount member 101A--.

COLUMN 5

Line 19, "102," should read --102--.

Signed and Sealed this

Twenty-seventh Day of September, 1988

*Attest:*

DONALD J. QUIGG

*Attesting Officer*      *Commissioner of Patents and Trademarks*